United States Patent [19]
Chelliah

[11] Patent Number: 5,915,220
[45] Date of Patent: Jun. 22, 1999

[54] SYSTEM AND METHOD FOR MAINTAINING PROFILE INFORMATION IN A TELECOMMUNICATIONS NETWORK

[75] Inventor: Sivananthan Chelliah, Plano, Tex.

[73] Assignee: Northern Telecom Limited, Canada

[21] Appl. No.: 08/851,322

[22] Filed: May 5, 1997

[51] Int. Cl.⁶ .................................................. H04Q 7/20
[52] U.S. Cl. ..................... 455/435; 455/432; 455/433; 455/517; 455/414
[58] Field of Search ................................. 455/435, 432, 455/433, 517, 414, 415, 416, 417

[56] References Cited

U.S. PATENT DOCUMENTS

| | | | |
|---|---|---|---|
| 5,379,451 | 1/1995 | Nakagoshi et al. | 455/435 |
| 5,390,234 | 2/1995 | Bar-Noy et al. | 455/435 X |
| 5,642,398 | 6/1997 | Tiedemann et al. | 455/435 X |

Primary Examiner—Wellington Chin
Assistant Examiner—Yemane Woldetatios
Attorney, Agent, or Firm—Carr & Storm, LLP

[57] ABSTRACT

A system and method is implemented within a telecommunications network, such as a cellular telephone network, for maintaining updated profile information for each mobile subscriber registered within the network. Updated profile information about each mobile subscriber is maintained within a particular mobile switching center currently communicating with the particular mobile subscriber. This process is performed with minimal utilization of bandwidth between the various mobile switching centers in the telecommunications network by maintaining subscriber service profile information within mobile switching centers, even though the associated mobile subscriber has roamed from that mobile switching center. When the subscriber service profile information is updated, then the subscriber service profile information is downloaded to a mobile switching center currently serving the mobile subscriber.

29 Claims, 6 Drawing Sheets

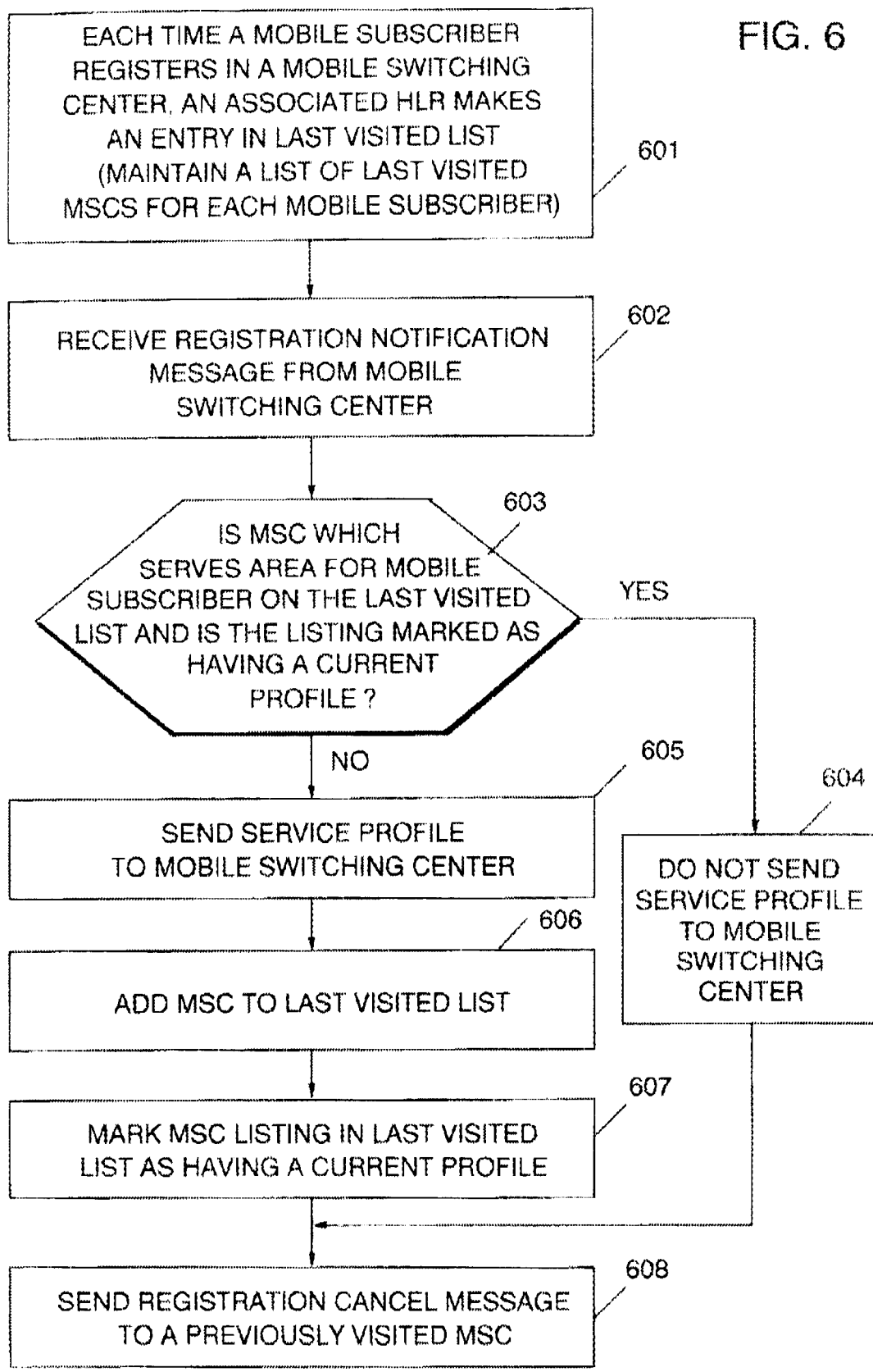

SYSTEM AND METHOD FOR MAINTAINING PROFILE INFORMATION IN A TELECOMMUNICATIONS NETWORK

TECHNICAL FIELD

The present invention relates in general to telecommunications networks, and in particular, to the maintenance of profile information for users in such networks.

BACKGROUND

In a cellular system, the geographic area which is serviced by the system is divided into cells. In each cell there is a base station possessing a number of transmitters and receivers, each of which is tuned to a different frequency or radio channel. A mobile subscriber within a cellular system has a transceiver which uses two radio channels to initiate a telephone call. Since government authorities allocate a fixed number of channels for mobile telephonic communications, subdividing the geographic area serviced by a system, or service area, into cells allows the same radio channel to be reused in more than one cell within the service area. Thus, the number of calls which the system can process at any given time is increased. A mobile switching center (MSC) within the service area determines the radio channels to which the mobile subscriber transceiver may tune to communicate with a base station. Furthermore, the MSC switches a base station transceiver to a switched telecommunications network, such as the public switched telephone network (PSTN) for transmission elsewhere.

To obtain mobile telephone service, a mobile subscriber must first make arrangements with a provider of mobile telecommunications services. In most cases, the services offered by the provider will extend beyond the area covered by a single mobile telecommunications system. Typically, the service provider may do so by owning or controlling a network of such mobile telecommunications systems, making arrangements with systems owned by others in other territories, or both. The service provider assigns each mobile telephone subscriber to a home MSC. The home MSC maintains a register called a home location register (HLR) in which subscribers assigned to that MSC are recorded or stored.

FIG. 1 illustrates an example of a network of cellular telecommunications systems. Mobile telecommunications network 100 includes a plurality of MSCs, such as MSC 101, MSC 103 and MSC 104. MSC 103 performs switching operations for base stations 108, 109 and 110 through communication links 113, 114 and 115, respectively. As defined herein, a communication link refers to any medium for transmitting a message. The message may be data, voice and/or video information, in an analog or a digital format. Communication links also include, without limitation, wireline media such as copper or fiberoptic cable, and wireless media such as radio frequency and microwave transmission systems. Similarly, MSC 104 performs the switching operations for base stations 111 and 112 through communication links 116 and 117, respectively. Although not illustrated in FIG. 1, MSC 101 is able to perform switching operations for a plurality of base stations. Each of the plurality of MSCs may be connected to PSTN 102. However, only the connection between MSC 101 and PSTN 102 has been illustrated in FIG. 1.

A mobile subscriber 120, is assigned, or homed, to MSC 101. However, in the example illustrated in FIG. 1, mobile subscriber 120 is travelling between the service areas corresponding to MSC 103 and 104. MSCs 101, 103 and 104 are interconnected by a data network which is represented using communications links 105, 106 and 107. It should be noted that no particular type of network protocol or network topology is intended to be represented by communications links 105, 106 and 107. Communications links 105, 106, and 107 are provided to indicate that each MSC is able to communicate data to another MSC using some form of data communication. Additionally, it should be noted that communications links 105–107 may be included as a portion of the PSTN or as dedicated connections. Furthermore, communications links 105, 106 and 107 are not intended to represent a network for carrying calls, although data may be communicated over the same networks which service voice calls.

During a communications operation, a service provider maintains a service profile for each of its mobile subscribers. A service profile includes information about the services to which a mobile user has subscribed, as well as other data necessary to provide a desired service. For example, a service profile may include information regarding one or more of the following: call forwarding, call waiting, three-way conferencing, calling features indicator, origination indicator, digits restriction, termination restriction code, digits carrier, routing digits, geographic authorization, authentication capability, DMH Account Code digits, DMH alternate billing digits, DMH billing digits, mobile directory number, message waiting notification count, message waiting notification type, origination triggers, PACA indicator, preferred language indicator, SMS origination restriction, SPNI PIN, SPNI Triggers, SMS termination restrictions, termination triggers, and the like.

A service profile for a mobile subscriber is stored by the HLR of the mobile subscriber's home MSC. HLR 121 represents a HLR for mobile subscribers assigned, or homed, to MSC 101. A HLR is implemented by a data processing system associated with a corresponding MSC. Furthermore, it should be noted that while HLR 121 is illustrated separately from MSC 101, this separation does not imply HLR 121 is physically separate from MSC 101. Indeed, the functions of HLR 121 may be performed by a computer which also operates MSC 101. In any instance, an HLR maintains and, as will be subsequently described, distributes to other MSCs, service profiles for subscribers assigned to it and homed to its corresponding MSC.

When a subscriber travels from an area serviced by its home MSC to another service area in the network of the service provider, the visited system will obtain the service profile of the mobile subscriber before providing service to the mobile subscriber. For example, when mobile subscriber 120 moves from a cell of MSC 103 to a cell of MSC 104, mobile subscriber 120 must register for service with MSC 104 before telephone service is available. Such a registration process begins when mobile subscriber 120 sends a standard message to a closest base station corresponding to MSC 104. FIGS. 2, 3 and 4 illustrate a prior art method for transferring service for a mobile subscriber from one visited system to another visited system within network 100. This prior art method is implemented in accordance with the IS41 North American Wireless Standard.

FIG. 2 depicts a flow chart which illustrates the steps performed by HLR 121 of MSC 101 during such a service transfer from a visited MSC 103 to another MSC 104. In step 201, HLR 121 receives a registration notification message from MSC 104. In step 202, the HLR 121 responds to the registration notification message by transmitting a service profile associated with mobile subscriber 120 to MSC 104. MSC 104 stores the service profile within an associated visiting location register (VLR) 123. VLR 123 includes a list of all mobile subscribers visiting the area serviced by MSC 104 and currently registered with MSC 104 for service. VLR 123 of MSC 104, like HLR 121 of MSC 101, is maintained by a data processing system. This data processing system can be part of, or separate from, the MSCs, within a system and may perform additional functions not specifically set forth herein. In the description provided herein, both the register and the data processing system maintaining the register are referred to herein as the VLR.

At step 203, HLR 121 of MSC 101 sends a registration cancel message to MSC 103 to cancel the registration of mobile subscriber 120 within VLR 125 of MSC 103. Thereafter, in step 204, HLR 121 of MSC 101 receives an acknowledgement of the registration cancel message from MSC 103.

FIG. 3 depicts a flow chart illustrating steps performed by VLR 125 of MSC 103. MSC 103 receives the registration cancel message from HLR 121 of MSC 101 in a step 301. In step 302, MSC 103 transmits an acknowledgement of the registration cancel message to HLR 121 of MSC 101. MSC 103 then deletes the service profile associated with mobile subscriber 120 from VLR 125 in step 303.

FIG. 4 illustrates a flow chart indicating a method performed using VLR 123 of MSC 104 to transfer the service of mobile subscriber 120 from MSC 103 to MSC 104. In step 401, MSC 104 (the visited MSC) receives the registration message from mobile subscriber 120. At step 402, MSC 104 transmits the registration notification message to HLR 121 of MSC 101. In step 403, MSC 104 receives the service profile associated with mobile subscriber 120 sent from HLR 121 of MSC 101. This step corresponds to step 202 of FIG. 2. The service profile is subsequently stored within VLR 123 of MSC 104.

The communication of messages and service profiles between MSCs 101, 103 and 104 occur over a data network. represented by communications links 105, 106 and 107.

The methods represented by FIG'S 2, 3 and 4 are partially accomplished through the use of a data processing system implemented at each MSC. An example of such a data processing system is data processing system 500 illustrated in FIG. 5. Data processing system 500 includes a central processing unit (CPU) 510, such as a conventional microprocessor, and a number of other elements interconnected via one or more system buses, which are collectively represented by bus 512. These elements include a random access memory (RAM) 514 for temporary storage of data and program instructions, read only memory (ROM) 516 for read only storage of data and program instructions, an input/output (I/O) adapter 518 for connecting peripheral devices such as disk units 520 and tape drives 540 to bus 512, a user interface adapter 522 for connecting keyboard 524 and mouse 526, a communications adapter 534 for connecting the data processing system to a data network, and a display adapter 536 for connecting bus 512 to display device 538. The data processing system 500 is provided as one embodiment of a data processing system. It should be noted that a data processing system used by a MSC need not include all of the elements illustrated in FIG. 2 and may perform other data processing functions associated with the MSC and not specifically described herein.

SUMMARY OF THE INVENTION

A limitation of the prior art methodologies outlined above is that, each time a mobile subscriber moves from one visited MSC to another visited MSC, the mobile subscriber's service profile must be transmitted, consuming bandwidth on a data network interconnecting the visited MSCs with a home MSC of the mobile subscriber. The tremendous growth in mobile communications traffic has necessitated the use of multiple MSCs in a metropolitan area. As the area served by a single MSC shrinks, there is a corresponding increase in a number of visiting subscribers within a network and in a number of new registrations to be performed by an MSC.

This problem is heightened in a metropolitan area network. For example, when a delivery truck or cab traverses a metropolitan area, it is likely to visit several MSCs and may even register with the same MSC several times in one day. As previously described, each registration with a visited MSC involves a transfer of a service profile corresponding to the mobile user on the network interconnecting the MSCs and, therefore, a load on the visited MSC is increased. Furthermore, as more services, such as Wireless Intelligent Network ("WIN"), become available to a mobile subscriber, the service profiles associated with the mobile subscriber will grow larger.

In accordance with one embodiment of the present invention, traffic on data networks interconnecting mobile switching centers in a communications system is reduced. Thus, the demand on bandwidth of the data network is alleviated by eliminating unnecessary transmission of service profile information. In particular, loads of mobile switching centers in the communications system are reduced when a home switching system or a centralized register serving several switching systems recognizes that service profiles for a subscriber do not need to be transmitted to a visited switching systems when the visited switching system was previously sent (within a predetermined time period) a most current service profile for the mobile subscriber. According to one aspect of the invention, a service profile maintenance system for subscribers of a mobile communication system or for a network of such systems maintains a list of last visited mobile telecommunications systems for each mobile subscriber. Upon receiving a registration notification from a visited system, the service profile maintenance system determines whether a visited system is on the list of last visited systems which has previously received the subscriber's current profile for that mobile subscriber. The service profile maintenance system will send the service profile in response to a registration message from the visited system only when the system is not on the list of last visited systems.

According to another aspect of the invention, a mobile switching center stores a service profile of a visiting subscriber following receipt of a registration cancel message so that the service profile is not downloaded again if the visiting subscriber returns to that system.

According to yet another aspect of the present invention, when a service profile associated with a particular subscriber is modified, the mobile switching center maintaining a subscriber's service profile will mark all entries in the list of last visited systems as changed or "dirty," or deletes the visited systems from the list with the exception of an entry associated with a mobile switching center in which the subscriber is then registered. When the subscriber revisits any of these mobile switching centers, the updated profile information will be sent to that mobile switching center.

The forgoing summary is intended only to explain advantages of the invention in its various aspects and is not intended to limit the invention as defined in the appended claims in any manner.

BRIEF DESCRIPTION OF THE DRAWINGS

For a more complete understanding of the present invention and the advantages thereof, following is a description of a preferred embodiment which is made in reference to the accompanying drawings, in which:

FIG. 6 is a flow diagram of a method for maintaining profile information for mobile users 2 in accordance with one embodiment of the present invention;

DETAILED DESCRIPTION

Figure 1:
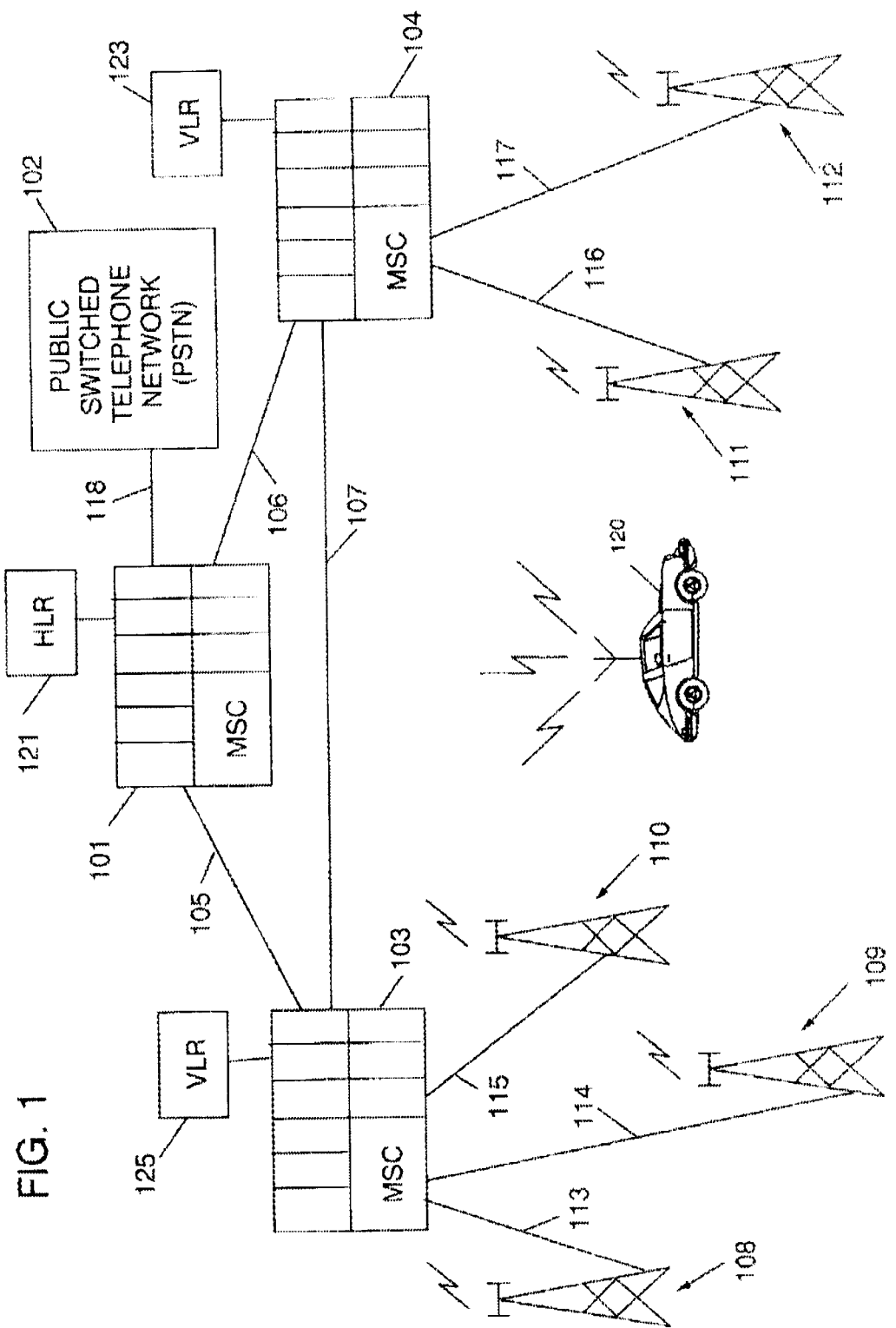
FIG. 1 is a schematic illustration of a typical cellular communication network.

Refer now to the drawings wherein depicted elements are not necessarily shown to scale and wherein like or similar elements are designated by the same reference numeral through the several views.

FIG. 6 illustrates a methodology for maintaining profile information for mobile users in accordance with one embodiment of the present invention. Referring now to FIG. 6, together with FIG. 1, during operation of one embodiment of the present invention, a subscriber service profile maintenance system, such as home location register HLR 121, maintains service profiles for mobile subscribers assigned to home mobile switching center MSC 101. For each subscriber, or subscriber service profile, HLR 121 also maintains a last visited list of each mobile communications system, such as mobile switching centers MSCs 103 and 104, with which the subscriber has previously registered. It should be noted that the last visited list includes a number of MSCs which a mobile subscriber has previously visited, and is not limited to a single MSC which was immediately visited prior to being noted in the last visited list. Each entry on the last visited list is maintained indefinitely. In the alternative, each entry on the last visited list is maintained for at least a predetermined time period or until the last visited list has reached a preselected maximum length. When the last visited list reaches the maximum length, the last visited list may then be purged.

For example, in step 601 of FIG. 6, when mobile subscriber 120 registers with a MSC other than home MSC 101, HLR 121 or MSCIO1 makes an entry into a last visited list for mobile subscriber 120. This last visited list is stored and maintained by data processing system 300 which provides control information for HLR 121.

Subsequently, when mobile subscriber 120 registers with visited, MSC, such as MSC 104, the visited MSC sends a registration notification message via communications link 106 to HLR 121. When HLR 121 receives the registration notification message from a visited MSC 104 in step 602, the subscriber service profile maintenance system reviews the last visited list to determine whether visited MSC 104 is included on the last visited list for mobile subscriber 120 (step 603). If the visited MSC sending the registration notification message is not on the last visited list, the mobile subscriber's (120) service profile is transmitted to the visited MSC in step 605. If the MSC sending the registration notification message is on the last visited list, the subscriber's service profile is not transmitted to the visited MSC. The subscriber's service profile maintenance system transmits an acknowledgment of the registration, but the subscriber's entire service profile is not transmitted to the visited MSC. It should be noted that the service profile will remain on the visited MSC either indefinitely or for a predetermined time period, as determined by a designer of the communications system.

After mobile subscriber's 120 service profile is transmitted to visited MSC 104, HLR 121 adds visited MSC 104 to the last visited list stored therein in a step 606. Next, in a step 607, HLR 121 marks the last visited list to indicate mobile subscriber 120 is currently within an area serviced by visited MSC 104. At step 608, the subscriber service profile system transmits a registration cancel message to visited MSC 103, with which mobile subscriber 120 is then currently registered.

As will be described below with respect to FIG. 7, when mobile subscriber 120 registers with visited MSC 104 during a previous visit, the profile information associated with mobile subscriber 120 continues to be stored by visited MSC 104. Therefore HLR 121 is not required to send the profile information to visited MSC 104.

Figure 7:
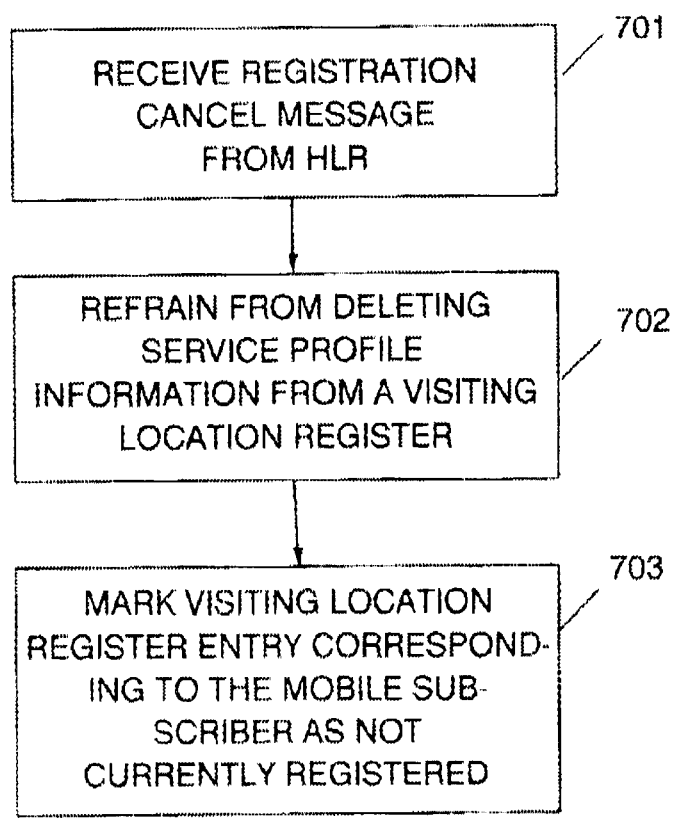
FIG. 7 is a flow diagram of a method for maintaining a mobile subscriber's service profile data within a cellular communications network in accordance with one embodiment of the present invention.

FIG. 7 illustrates a method performed by visited MSCs, such as MSC 103 and MSC 104, for maintaining subscriber service profile information associated with mobile subscribers in accordance with one embodiment of the present invention. In step 701, a visited MSC such as MSC 103, receives the registration cancel message from HLR 121

Figure 2:
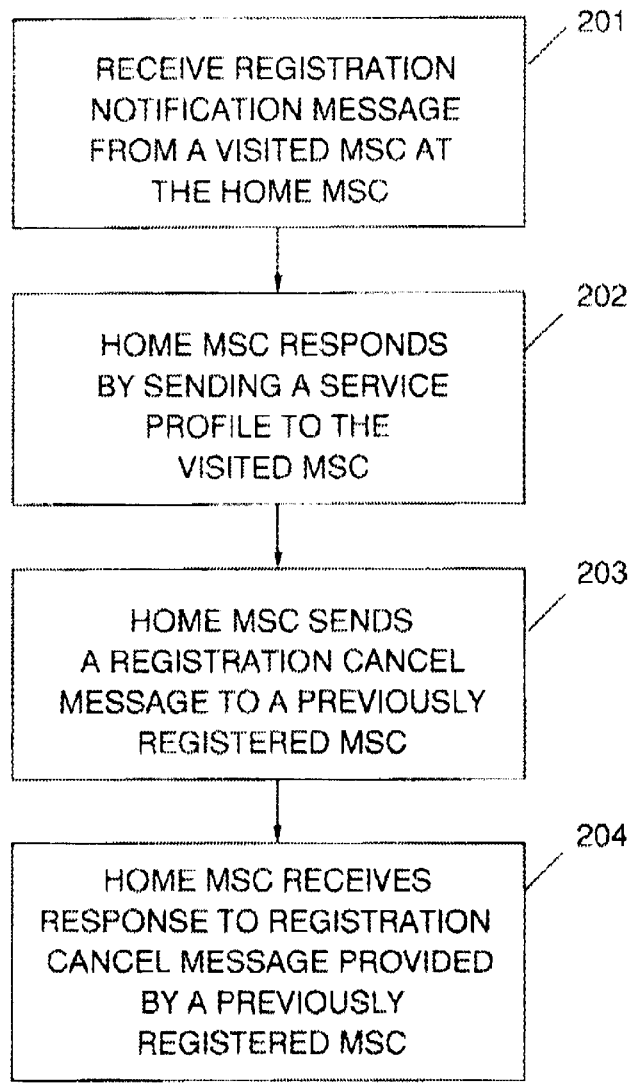
FIG. 2 is a flow diagram of a prior art method of downloading service profile data in a cellular communications network.
Figure 3:
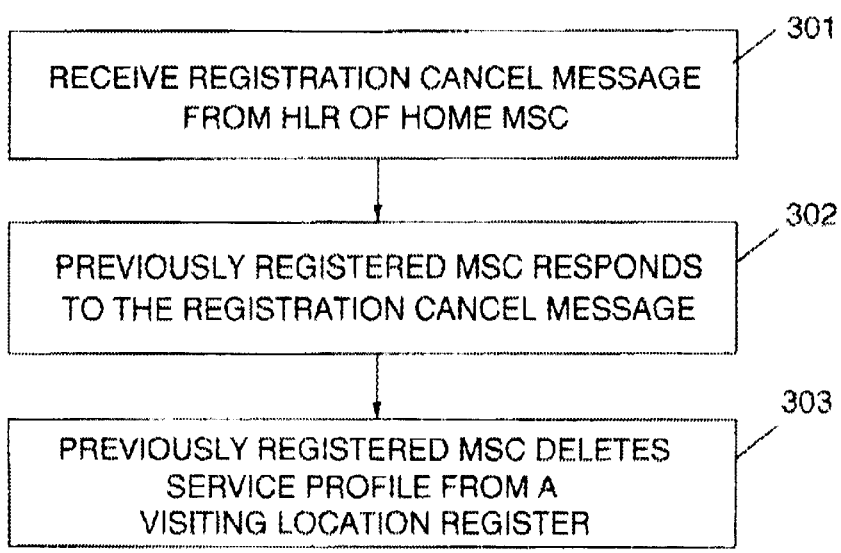
FIG. 3 is a flow diagram of a prior art method for cancelling a registration of a mobile subscriber at a visited MSC.
Figure 4:
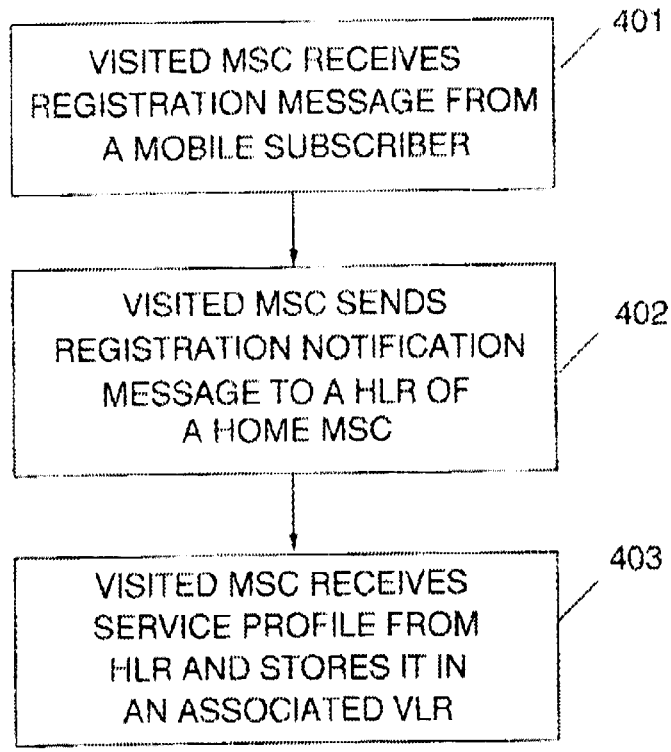
FIG. 4 is a flow diagram of a prior art method for registering a mobile subscriber at a visited MSC.

In response to receiving the registration cancel message from HLR 121, the visited MSC 103 does not delete the profile information associated with mobile subscriber 120 from its VLR (125). Note, the visiting location registers (VLRs) within the various mobile switching centers (MSCs) may be one of the data storage or memory devices illustrated in FIG. 2.

Thereafter, in step 703, visited MSC 103 marks, or tags, the service profile information stored within VLR 125 corresponding to mobile subscriber 120. Therefore, a next time mobile subscriber 120 registers with MSC 103, MSC 103 will note the tagging of the entry associated with mobile subscriber 120 and will send a registration notification message to HLR 121 of MSC 101.

When mobile subscriber 120 roams from MSC 104 to MSC 103, the method described above with respect to FIG. 7 is performed within MSC 104. Furthermore, when the methodologies of FIGS. 6 and 7 are executed, the profile information associated with mobile subscriber 120 is not downloaded from HLR 121 of MSC 101 to each of MSCs 103 and 104 each time mobile subscriber 120 registers with these MSCs, if these MSCs were previously visited by mobile subscriber 120 and that previous visit is reflected on the last visited list maintained within HLR 121 of MSC 101. As previously described, the registration process is a well-known process implemented in accordance with the IS41 standard.

MSCs 103 and 104 may store subscriber service profile information within corresponding VLRs 125 and 123, indefinitely. Alternatively, the subscriber service profile information may be maintained for a programmable period of time. It should be noted that well-known audit processes may be implemented to periodically delete VLR entries. Such audit processes are well-known to those with skill in the relevant art and will not be described in further detail herein.

Figure 8:
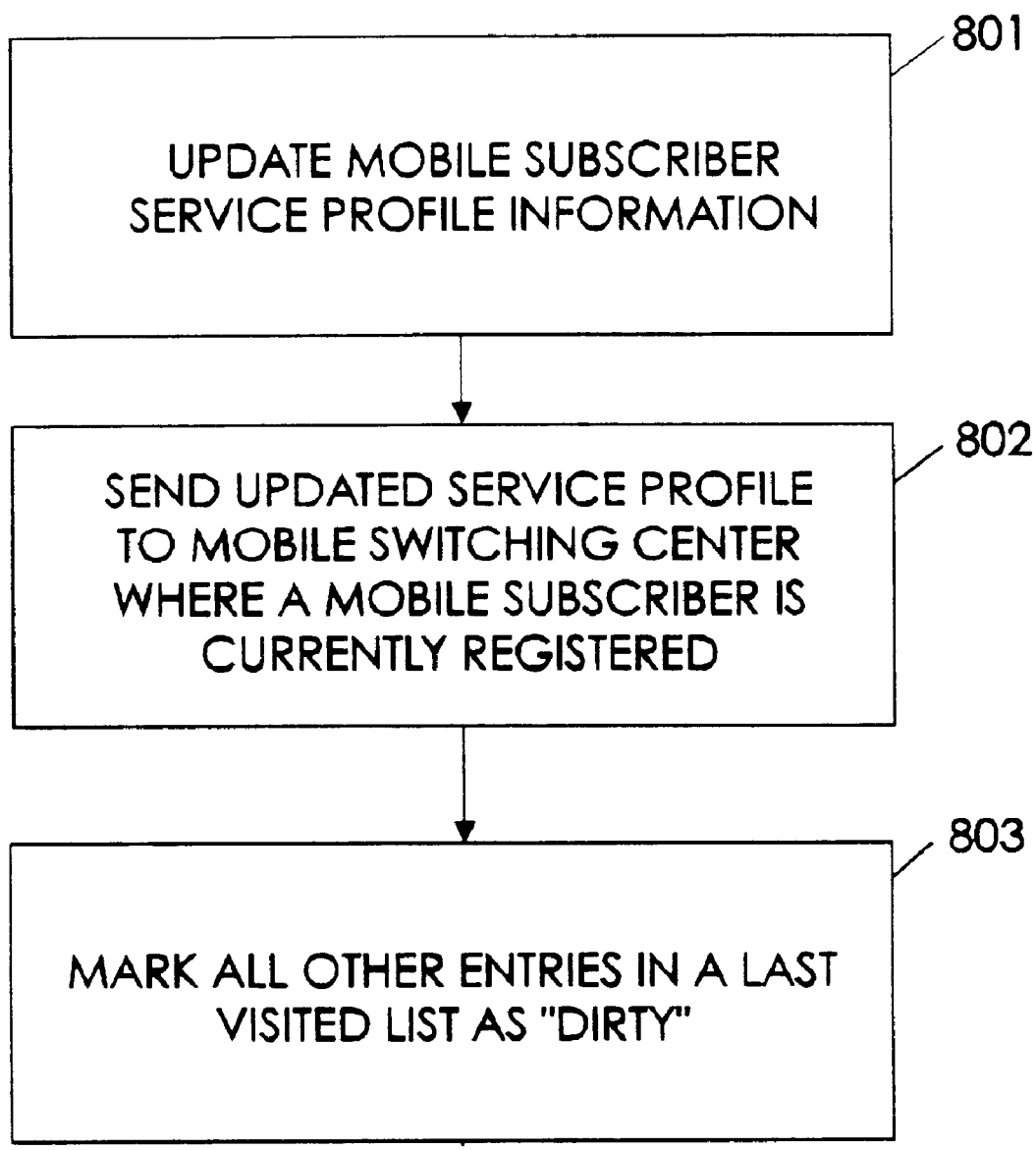
FIG. 8 is a flow diagram of a method for updating a mobile subscriber's service profile data in accordance with the present invention.

FIG. 8 illustrates a method for updating the subscriber service profile information associated with a particular mobile subscriber or user. In step 801, HLR 121 of home MSC 101 updates the subscriber service profile information associated with a particular mobile subscriber. Such updating operations may be used to reflect extra services, such as call forwarding, provided to mobile subscriber 120. Thereafter, in step 802, the updated subscriber service profile information is sent from HLR 121 of MSC 101 to a mobile switching center where mobile subscriber 120 is currently registered. In the example described above, the subscriber 120 has relocated from MSC 103 to MSC 104 and is registered with MSC 104.

Subsequently, in step 803, HLR 121 of MSC 101 marks all other entries in the last visited list maintained for mobile subscriber 120 as "dirty." Stated another way, the entry in the last visited list foi mobile subscriber 120 associated with MSC 103, which was a mobile switching center previously visited by mobile subscriber 120, will be marked as containing "dirty" profile information. For example, HLR 121 of MSC 101 now notes that the subscriber service profile information stored within the VLR 125 of MSC 103 is not the most current profile information associated with mobile subscriber 120. The marking step executed in step 803 is implemented in one embodiment of the present invention. Additionally, it should be noted that in an alternate embodiment of the present invention, the entries may be deleted by MSC 101.

Note that when sending the updated subscriber service profile information in step 802, the communications system of the present invention may merely send a portion of information within the subscriber service profile that has been modified, rather than sending the entire subscriber service profile.

Figure 5:
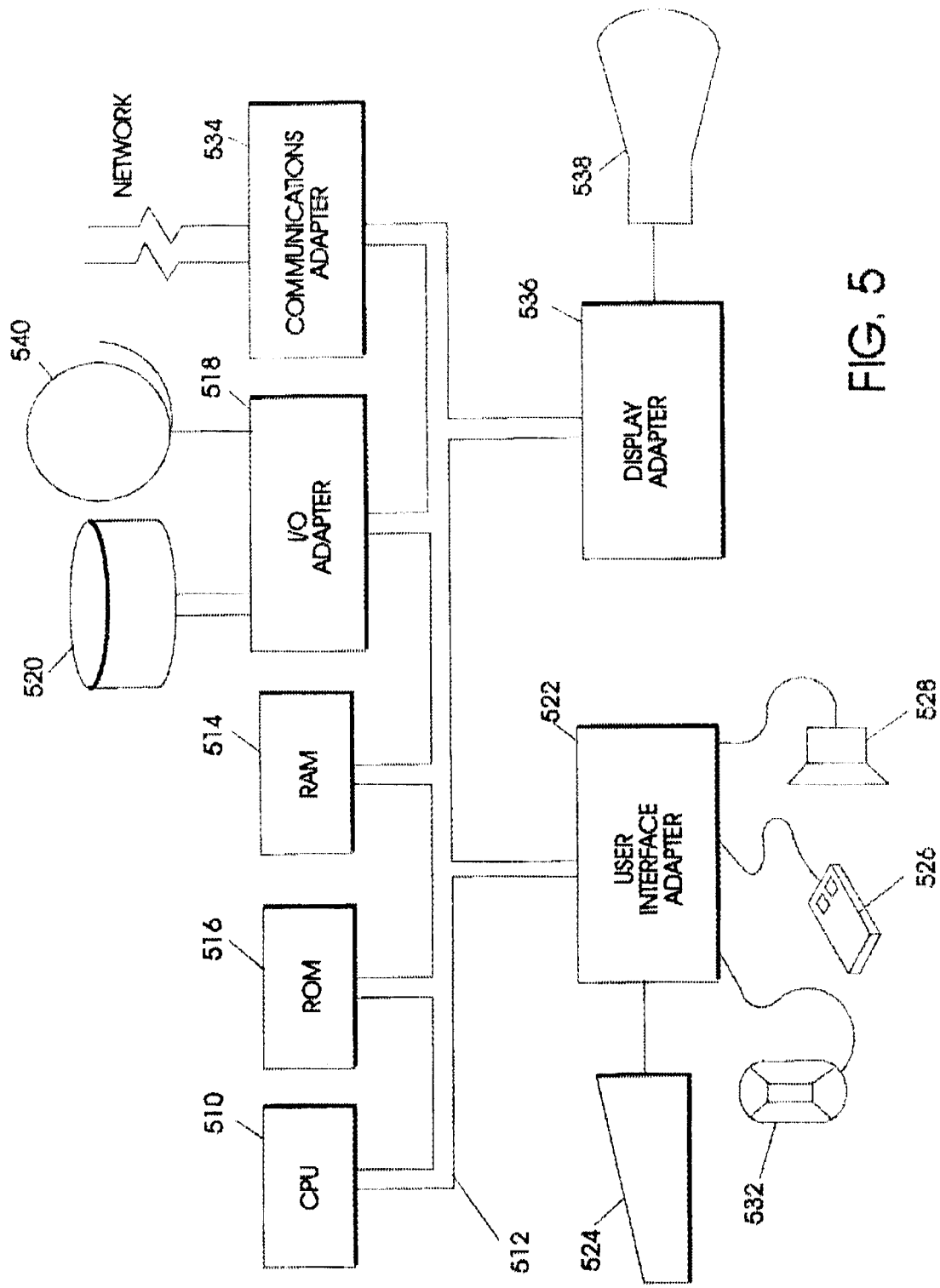
FIG. 5 is a block diagram of a data processing system used to implement the various systems and methods of the present invention within a cellular communications network.

With respect to step 606, HLR 121 of MSC 101 may include some type of algorithm (based on SID, proximity of the systems, FIFO, etc.) to decide if an MSC should be added to the last visited list. The processes illustrated in FIGS. 6–8 may each be controlled by software running on a data processing system such as data processing system 500 of FIG. 5. However, the process may, alternately, be performed exclusively by hardware or firmware, or by a combination of hardware, firmware and/or software. When implemented as software, the software is stored within a data storage device, such as storage devices 220 and 240, or on some other transferable storage media such as a CD-ROM, floppy disc or tape, and loaded into RAM 214 for execution.

Furthermore, the forgoing steps of the illustrated method are executed by HLR 121 for mobile subscribers homed, or assigned, to MSC 101.

The foregoing description is one embodiment of the present invention. Specific details are set forth to provide an understanding of this embodiment. However, those skilled in the art will recognize that the present invention may be embodied in alternate forms, or with modifications, and may be practiced with substitutions and other changes to the present embodiment. Although the present invention and its advantages have been described in detail, it should be understood that various modifications, substitutions and alterations can be made to the embodiment of the invention described herein without departing from the spirit and scope of the invention as defined by the appended claims.

What is claimed is:

1. In a telecommunications network including a plurality of systems for serving a telecommunications device, wherein said plurality of systems are coupled to a home system, a method comprising the steps of:

receiving a message from a first one of said plurality of systems at said home system when said telecommunications device registers with said first one of said plurality of systems after roaming from a second one of said plurality of systems to said first one of said plurality of systems;

determining if said telecommunications device had registered with said first one of said plurality of systems during a predetermined period of time preceding said registration of said telecommunications device with said first one of said plurality of systems;

not sending a profile associated with said telecommunications device in response to receipt of said message by said home system if said telecommunications device had previously registered with said first one of said plurality of system; and sending said profile associated with said telecommunications device from said home system to said first one of said plurality of systems, in response to receipt of said message if said telecommunications device had not previously registered with said first one of said plurality of systems within said predetermined period of time preceding said registration of said telecommunications device with said first one of said plurality of systems.

2. The method as recited in claim 1, further comprising the step of:

maintaining a list of one or more of said plurality of systems that have recently registered with said telecommunications device within a predetermined time period, wherein said step of not sending said profile is performed when said first one of said plurality of systems is in said list.

3. The method as recited in claim 2, further comprising the steps of:

receiving an update to said profile of said telecommunications device to form an updated profile;

sending said updated profile by said home system to said first one of said plurality of systems;

tagging all entries in said list, except an entry associated with said first one of said plurality of systems, to generate a plurality of tagged entries to indicate that a portion of said plurality systems associated with said plurality of tagged entries do not comprise said updated profile; and sending said updated profile to a third one of said plurality of systems by said home system when said telecommunications device roams from said first one of said plurality of systems to said third one of said plurality of systems and registers with said third one of said plurality of systems, wherein said third one of said plurality of systems has an associated tagged entry in said list.

4. The method as recited in claim 2, wherein said list maintains a record of a last N systems with which said telecommunications device had registered, wherein N is a positive integer.

5. The method as recited in claim 4, wherein said step of sending said profile associated with said telecommunications device by said home system to said first one of said plurality of systems, in response to receipt of said message, is performed when said first one of said plurality of systems is not one of said N systems in said list.

6. The method as recited in claim 1, further comprising the step of:
   maintaining a record of said profile in said second one of said plurality of systems.

7. The method as recited in claim 6, wherein said record of said profile is maintained in said second one of said plurality of systems in response to receipt of a message from said home system to cancel a registration of said telecommunications device with said second one of said plurality of systems.

8. The method as recited in claim 1, wherein said telecommunications network comprises a cellular network, and wherein said telecommunications device is a cellular telephone.

9. The method as recited in claim 1, further comprising the steps of:
   receiving a message from said second one of said plurality of systems by said home system when said telecommunications device registers with said second one of said plurality of systems after roaming from said first one of said plurality of systems to said second one of said plurality of systems; and
   not sending said profile associated with said telecommunications device by said home system in response to receipt of said message from said second one of said plurality of systems when said telecommunications device registers with said second one of said plurality of systems.

10. The method as recited in claim 1, further comprising the steps of:
    receiving an update to said profile of said telecommunications device;
    sending said updated profile by said home system to said first one of said plurality of systems; and
    sending said updated profile to a third one of said plurality of systems by said home system when said telecommunications device roams from said first one of said plurality of systems to said third one of said plurality of systems and registers with said third one of said plurality of systems.

11. A telecommunications network comprising:
    a plurality of systems operable for serving communication needs of a telecommunications device;
    a home system operable for controlling said telecommunications network, said plurality of systems coupled to said home system, wherein said home system further comprises:
       circuitry operable for maintaining a record of a portion of said plurality of systems with which said telecommunications device had previously registered; and
       circuitry operable for sending a profile associated with said telecommunications device to a first one of said plurality of systems in response to receipt of a message from said first one of said plurality of systems that said telecommunications device has registered with said first one of said plurality of systems after roaming from a second one of said plurality of systems to said first one of said plurality of systems, wherein said profile is sent to said first one of said plurality of systems when said first one of said plurality of systems is not one of the record of said portion of said plurality of N systems.

12. The network as recited in claim 11, further comprising:
    circuitry operable for storing said profile in said second one of said plurality of systems.

13. The network as recited in claim 12, wherein storage of said profile in said second one of said plurality of systems is maintained when a message is received by said second one of said plurality of systems from said home system to cancel a registration of said telecommunications device with said second one of said plurality of systems.

14. The network as recited in claim 11, wherein said telecommunications network includes a cellular network, and wherein said telecommunications device is a cellular telephone.

15. The network as recited in claim 11, wherein said home system further comprises:
    circuitry operable for receiving a message from said second one of said plurality of systems when said telecommunications device registers with said second one of said plurality of systems after roaming from said first one of said plurality of systems to said second one of said plurality of systems; and
    circuitry operable for not sending said profile associated with said telecommunications device to said second one of said plurality of systems in response to receipt of said message from said second one of said plurality of systems when said telecommunications device registers with said second one of said plurality of systems.

16. The network as recited in claim 11, wherein said home system further comprises:
    circuitry operable for receiving an update to said profile of said telecommunications device;
    circuitry operable for sending said updated profile to said first one of said plurality of systems; and
    circuitry operable for tagging all entries in said record to form a plurality of tagged entries, except an entry associated with said first one of said plurality of systems, as indicating that systems associated with said plurality of tagged entries do not comprise said updated profile.

17. The network as recited in claim 16, wherein said home system further comprises:
    circuitry operable for sending said updated profile to a third one of said plurality of systems when said telecommunications device roams from said first one of said plurality of systems to said third one of said plurality of systems and registers with said third one of said plurality of systems, wherein said third one of said plurality of systems has an associated tagged entry in said list.

18. The network as recited in claim 11, wherein said home system further comprises:
    circuitry operable for not sending said profile from to said first one of said plurality of systems when said first one of said plurality of systems is in said record.

19. The network as recited in claim 11, wherein said record is of a last N systems with which said telecommunications device has registered.

20. The network as recited in claim 11, wherein said network is coupled to a public switched telephone network.

21. In a cellular communications network comprising first and second systems, a method comprising the steps of:
    receiving a registration message from a cellular telephone by said second system;

sending a registration notification message indicating that said cellular telephone has registered with said second system from said second system to said first system;

determining if said second system is included in a stored record in said first system to indicate that said cellular telephone has previously registered with said second system; and not sending a profile associated with said cellular telephone to said second system when said stored record indicates that said cellular telephone has previously registered with said second system.

22. The method as recited in claim 21, wherein said profile is not sending in said second system when said stored record indicates that said cellular telephone has previously registered with said second system because said profile is already stored in said second system.

23. The method as recited in claim 22, further comprising the step of:

sending said profile associated with said cellular telephone from said first system to said second system when said stored record indicates that said cellular telephone has not previously registered with said second system.

24. The method as recited in claim 23, wherein said stored record includes a last N systems within said network with which said cellular telephone has registered.

25. The method as recited in claim 24, wherein when said second system is one of said last N systems.

26. The method as recited in claim 24, wherein said profile is sent to said second system from said first system when said second system is not one of said last N systems.

27. The method as recited in claim 21, wherein said network further includes a third system coupled to said first system, and wherein said cellular telephone had been registered with said third system prior to registering with said second system, said method further comprising the steps of:

receiving a registration message from said cellular telephone by said third system;

sending a registration notification message indicating that said cellular telephone has registered with said third system from said third system to said first system;

determining that said third system is included in said stored record in said first system to indicate that said cellular telephone has previously registered with said third system; and not sending said profile associated with said cellular telephone from said first system to said third system.

28. The method as recited in claim 27, further comprising the steps of:

sending a message to cancel said registration of said cellular telephone with said second system from said first system to said second system; and maintaining a record of said profile in said second system upon receiving said message to cancel said registration of said cellular telephone with said second system.

29. The method as recited in claim 21, wherein said registration notification message complies with an IS41 standard.

* * * * *

UNITED STATES PATENT AND TRADEMARK OFFICE
CERTIFICATE OF CORRECTION

PATENT NO. : 5,915,220
DATED : June 22, 1999
INVENTOR(S) : Chelliah

It is certified that error appears in the above-identified patent and that said Letters Patent is hereby corrected as shown below:

Column 3, line 37    Delete "." after "network"

Column 5, line 62    Delete "MSCI01"
                     Insert --MSC 101--

Column 5, line 67    Insert --a-- before "visited"

Column 7, line 26    Delete "foi"
                     Insert --for--

Column 10, line 56   Delete "from"

Column 11, line 13   Delete "sending in"
                     Insert --sent to--

Signed and Sealed this

Tenth Day of April, 2001

Attest:

NICHOLAS P. GODICI

Attesting Officer    Acting Director of the United States Patent and Trademark Office